F. A. STALL, Jr.
VEHICLE TIRE.
APPLICATION FILED SEPT. 12, 1907.

902,009.

Patented Oct. 27, 1908.

Inventor
FREDRICK A. STALL, JR.
By Henry P. Blair
Attorney

Witnesses

UNITED STATES PATENT OFFICE.

FREADRICK AUGUSTUS STALL, JR., OF DARLINGTON, SOUTH CAROLINA.

VEHICLE-TIRE.

No. 902,009.      Specification of Letters Patent.      Patented Oct. 27, 1908.

Application filed September 12, 1907. Serial No. 392,478.

*To all whom it may concern:*

Be it known that I, FREADRICK A. STALL, Jr., a citizen of the United States, residing at Darlington, in the county of Darlington and State of South Carolina, have invented certain new and useful Improvements in Vehicle-Tires, of which the following is a specification.

This invention relates to certain new and useful improvements in vehicle tires.

Rubber tires for ordinary vehicles, such as carriages, buggies, light wagons, automobiles, etc. are now in general use, the preferred structure being a rubber tire having a wire passed longitudinally therethrough to secure the same in position upon the periphery of the wheel. This tire, when in use is subject to considerable lateral strain and vibration which causes the round wire which secures the same in position, to work right through to the periphery of the wheel, thus permitting the tire to stretch and eventually drop off, and also allowing the same to roll under the lateral strain.

My invention has for its object the production of a tire and means for securing the same in position, which are so constructed as to practically overcome this cutting effect of the wires, and to provide means whereby the tire is securely fastened in position in such manner as to afford a maximum resistance to the rolling action of the lateral strain.

A further object is to secure the tire in such position on the vehicle wheel as to secure a maximum bearing surface.

The invention will be hereinafter fully set forth and particularly pointed out in the claim.

Figure 1:
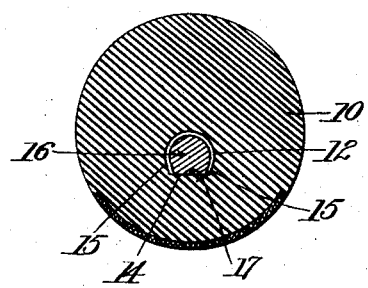
Figure 2:
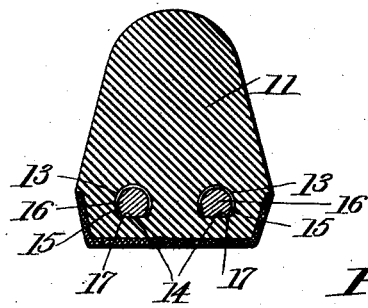
Figure 4:
Figure 3:
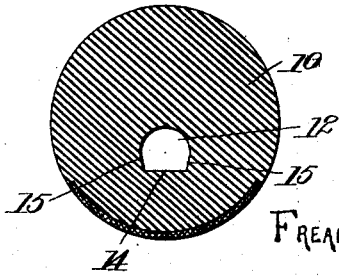

In the accompanying drawing:—Figures 1 and 2 are cross sectional views of two different forms of vehicle tires embodying my invention. Fig. 3 is a sectional view of one of said forms with the securing wire removed. Fig. 4 is a detail view of the wire.

Referring to the drawing, 10, 11, designate two different forms of tires, the tire 10 being provided with a single longitudinal opening 12 arranged approximately two thirds of the distance from the tip or tread thereof. The tire 11 is provided with two holes 13 near the bottom thereof. Each of the holes or openings 12, 13 is formed with a bottom wall which is flattened at 14 said bottom wall joining the top or arched portion of the holes or openings by slightly inclined faces 15. The securing wires 16 are each provided with a flattened face 17 arranged to bear upon the bottom wall 14, said wire serving to secure the tire in position in the usual and well known manner.

In practice, the flattened bottom portion of the hole or opening in the tire, and the flattened contact face of the wire, provide a maximum bearing surface, whereby the wire will rigidly secure the tire in position and prevent lateral movement thereof while in use. The flattened bearing surface also prevents the wire from working down through the rubber of which the tire is usually composed, and thereby provides an efficient means to prevent stretching of the tire. At the same time, it will be observed that by forming the holes or openings with the slightly inclined faces adjacent the bottom wall, the wire is prevented from cutting through the tire as the latter tends to roll under the lateral strain.

I claim as my invention:—

The combination with a vehicle wheel, of a resilient tire provided with a longitudinal bore having a flattened unbroken bottom face, an arched top face, and upwardly diverging side walls connecting said top and bottom faces, and an approximately cylindrical securing wire threaded through said bore and provided with a smooth, unbroken flattened bottom face contacting with the bottom face of said bore.

In testimony whereof I affix my signature, in presence of two witnesses.

FREADRICK AUGUSTUS STALL, JR.

Witnesses:
    JAMES R. COGGESHALL,
    W. ALBERT PARROTT.